United States Patent Office 3,414,625
Patented Dec. 3, 1968

3,414,625
PROCESS FOR PREPARING TERTIARY PHOSPHINES
Joseph G. Natoli, Old Bridge, and Alfred A. Lach, Perth Amboy, N.J., assignors to M & T Chemicals Inc., New York, N.Y., a corporation of Delaware
No Drawing. Filed Nov. 12, 1964, Ser. No. 410,735
10 Claims. (Cl. 260—606.5)

ABSTRACT OF THE DISCLOSURE

In accordance with certain of its aspects, the process of this invention for preparing trialkylphosphine may comprise (1) reacting a lower alkyl Grignard reagent with phosphorous trihalide in the presence of an organic ether thereby forming product mixture containing trialkylphosphine, organic ether, and magnesium halide; (2) adding to said product mixture water in amount at least sufficient to convert substantially all of said magnesium halide to magnesium halide hexahydrate; (3) separating said magnesium halide hexahydrate from said product mixture thereby forming a magnesium halide-free product mixture; (4) adding to said magnesium halide-free product mixture, water and acid selected from the group consisting of hydrogen halide and sulfuric acid thereby forming an aqueous phase containing trialkylphosphine salt; (5) separating organic ether from said magnesium halide-free product mixture thereby forming an ether-free product mixture; (6) adding base to said magnesium halide-free and ether-free product mixture in said aqueous phase thereby forming trialkylphosphine; and (7) recovering said trialkylphosphine.

---

This invention relates to a process for preparing trialkylphosphine in high yield and high purity.

As is known to those skilled in the art, the preparation of organophosphines, typically trialkylphosphines, may produce a reaction product mixture which contains large quantities of by-products and contaminants. For example, when trialkylphosphine is prepared by the reaction of phosphorous trihalide with an alkyl Grignard reagent in accordance with prior art processes, the reaction product mixture formed may contain magnesium halide, ether, hydrocarbon solvent, phosphorous-containing by-products, etc. Separation and purification of the trialkylphosphine from such a mixture according to prior art techniques are difficult and complicated. Typically, trialkylphosphine of satisfactorily high purity can be obtained only by distillation, typically at low pressure and high temperature, e.g., 120–150° C. During this distillation, loss of product may occur because of thermal degradation. An inert atmosphere must be maintained during the distillation and the equipment required for such a distillation is expensive to purchase and maintain.

It is an object of this invention to provide novel and convenient techniques for obtaining high yields of high purity trialkylphosphine. Other objects will become apparent to those skilled in the art from the following description.

In accordance with certain of its aspects, the process of this invention for preparing trialkylphosphine may comprise (1) reacting a lower alkyl Grignard reagent with phosphorous trihalide in the presence of an organic ether thereby forming product mixture containing trialkylphosphine, organic ether, and magnesium halide; (2) adding to said product mixture water in amount at least sufficient to convert substantially all of said magnesium halide to magnesium halide hexahydrate; (3) separating said magnesium halide hexahydrate from said product mixture thereby forming a magnesium halide-free product mixture; (4) adding to said magnesium halide-free product mixture, water and acid selected from the group consisting of hydrogen halide and sulfuric acid thereby forming an aqueous phase containing trialkylphosphine salt; (5) separating organic ether from said magnesium halide-free product mixture thereby forming an ether-free product mixture; (6) adding base to said magnesium halide-free and ether-free product mixture in said aqueous phase thereby forming trialkylphosphine; and (7) recovering said trialkylphosphine.

The process for preparing trialkylphosphine according to this invention may comprise, as a first step, the reaction of a lower alkyl Grignard reagent with phosphorous trihalide in the presence of an organic ether. The lower alkyl Grignard reagent may be represented by the structure RMgX wherein R may be lower alkyl and X may be halide. Lower alkyls may be alkyl groups having less than about five carbon atoms, typically ethyl, propyl, and butyl, including isomers thereof, e.g., isopropyl, sec-butyl, isobutyl, and tert-butyl. X may be halide, e.g., chloride, bromide, and iodide. Preferably, R may be n-butyl and preferably X may be chloride. Typical lower alkyl Grignard reagents which may be employed include ethylmagnesium bromide, ethylmagnesium chloride, n-propylmagnesium iodide, n-propylmagnesium chloride, isopropylmagnesium bromide, n-butylmagnesium chloride, sec-butylmagnesium iodide, tert-butylmagnesium bromide, isobutylmagnesium chloride, etc. The lower alkyl Grignard reagent may typically have been prepared by reaction of magnesium metal with the corresponding lower alkyl halide, preferably in the presence of an organic ether. The Grignard reagent may typically be employed in the process of this invention in the form of a solution of the Grignard etherate in ethers such as ethyl ether, propyl ether, tetrahydrofuran, methyl tetrahydrofuran, etc. Lower alkyl Grignard etherates in tetrahydrofuran solution may be highly preferred.

The phosphorus trihalide employed may be $PX_3$ wherein X may be halide, typically chloride, bromide, and iodide. Preferably X may be chloride. The X portion of $RMgX$ and $PX_3$ will preferably be the same. Typically the phosphorus trihalide may be phosphorus trichloride, phosphorus tribromide, or phosphorus triiodide and preferably it may be phosphorus trichloride.

Preferably, the phosphorus trihalide and lower alkyl Grignard reagent may be reacted together in substantially stoichiometric amounts, i.e., three moles of Grignard reagent per mole of phosphorus trihalide. Small excesses, e.g., up to about 15% excess of Grignard may be employed. A substantial excess of the phosphorus trihalide may lead to lower yield due to formation of mono- and dialkylhalophosphines.

The reaction between the lower alkyl Grignard reagent and the phosphorus trihalide may preferably take place in the presence of an organic ether as a reaction solvent and/or diluent. Organic ethers which may be employed in the practice of this invention may typically have the structure R'—O—R" wherein R' and R" may be alkyl radicals which may, if desired, be joined through carbon atoms or hetero (e.g., nitrogen or oxygen) atoms to form a cyclic ether preferably having a ring of 5–6 atoms. Typically, the organic ether may be the same as that used in the preparation of the lower alkyl Grignard reagent. The organic ethers employed will preferably have boiling points at atmospheric pressure of less than 180° C. and preferably less than 140° C.

Typical useful organic ethers may include diethyl ether, dibutyl ether, dioxane, tetrahydrofuran, tetrahydropyran, 2-methyltetrahydrofuran, 2-ethoxytetrahydropyran, tetrahydrofurfuryl ethyl ether, dihydropyran, N-ethylmorpholine, etc. The preferred organic ether may be tetrahydrofuran. The organic ether may typically be employed in the amount of 2 to 10 moles per mole of Grignard reagent. Preferably it may be present in the amount of 2–5, say 3 moles per mole of Grignard.

Preferably, the reaction between the lower alkyl Grignard reagent and the phosphorus trihalide may be effected in the presence of an inert liquid hydrocarbon diluent, i.e., a liquid hydrocarbon diluent which is not reactive toward the reactants. The inert hydrocarbon may be present in addition to the above-described organic ether. The inert hydrocarbon diluents which may be employed include those having a boiling point, at atmospheric pressure, of 60–180° C. and preferably 80–160° C. Illustrative inert hydrocarbon diluents which may be employed include n-hexane, n-heptane, n-octane, isooctane, benzene, cumene, toluene, and xylene. The preferred inert hydrocarbon diluent may be xylene. The intert hydrocarbon diluent may typically be employed in the amount of about 100–400 parts by weight, and preferably 175–225 parts by weight per 100 parts by weight of phosphorus trihalide.

Reaction between the phosphorus trihalide and lower alkyl Grignard reagent may be carried out by mixing together these reactants in the presence of the organic ether and, preferably, the inert hydrocarbon diluent. In the most preferred technique, the alkyl Grignard reagent may be prepared in the organic ether and may be employed in the form of the organic ether solution. The phosphorus trihalide may then be added to the ethereal Grignard solution, preferably over a period of time, say 60–260 minutes. Preferably, the phosphorus trihalide may be dissolved in the inert hydrocarbon diluent prior to the addition.

It is preferred that the reaction mixture be maintained at relatively low temperature, say 20° C.–45° C. and preferably about 35° C.–40° C. during the addition. A cooling bath or the like may be employed to control exotherm. When all of the reactants are combined, the so-formed mixture is preferably maintained at the reaction temperature, say 35–40° C. for an additional period of about 15–120 minutes, say 30 minutes, to ensure that the reaction is as complete as possible. The reaction may be as follows:

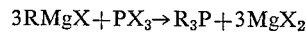

$$3RMgX + PX_3 \rightarrow R_3P + 3MgX_2$$

At this point, the product mixture may contain trialkylphosphine, organic ether, magnesium halide, phosphorus-containing byproducts, and inert hydrocarbon diluent, if employed.

In accordance with the practice of this invention, there may be added to the product mixture water in amount at least sufficient to convert substantially all of said magnesium halide to magnesium halide hexahydrate. The amount of water added may be at least about 5 moles and preferably 5–7, and most preferably 6 moles per mole of Grignard reagent employed. Preferably, the temperature of the product mixture may be maintained below about 50° C., and preferably 35–45° C., say 40° C. during the water addition and moderate agitation may be employed. When all of the water has been added, agitation may be continued for a short period of time, say 30 minutes, after which the magnesium halide hexahydrate phase either as solid crystal $MgX_2 \cdot 6H_2O$ or as aqueous solution thereof may be separated.

If the water is added in amount of greater than about 6 moles per mole of magnesium halide, there may be formed magnesium halide hexahydrate which may dissolve in the amount of water greater than about six moles. This may be separated from the product mixture thereby forming a magnesium halide-free product mixture, as by decantation. If the water be added in amount of about 6 moles per mole of magnesium halide, the magnesium halide hexahydrate may be formed as a slurry or solid crystal which may first be separated by filtration followed by decantation to remove aqueous liquid. If desired, the magnesium halide hexahydrate phase may be further treated to recover any organic ether contained therein.

In accordance with practice of this invention, the magnesium halide-free product mixture may be further treated by adding thereto water and acid selected from the group consisting of hydrogen halide and sulfuric acid thereby forming an aqueous phase containing trialkylphosphine salt, and separating organic ether from the magnesium halide-free product mixture thereby forming an ether-free product mixture. The acid which is added to the magnesium halide-free product mixture may be a strong, inorganic, nonoxidizing acid, typically selected from the group consisting of hydrogen halide and sulfuric acid. The hydrogen halide may be hydrogen chloride, hydrogen bromide or hydrogen iodide. Preferably, the acid may be hydrogen chloride. It will be understood that the trialkylphosphine salt formed will correspond to the acid used and may be, e.g., trialkylphosphine hydrochloride, trialkylphosphine hydrobromide, trialkylphosphine hydroiodide, trialkylphosphine sulfate, etc.

In accordance with a preferred embodiment of the process of this invention, the desired acid and water may be added to the magnesium halide-free product mixture to convert the trialkylphosphine to the trialkylphosphine salt of the acid and form an aqueous phase containing the trialkyl phosphine salt. The amount of acid added may typically be about 1–2 equivalents, say 1.65 equivalents per mole of trialkylphosphine present. The amount of trialkylphosphine present may be determined by removing an aliquot from the magnesium halide-free product mixture and analyzing as by gas chromatography. Preferably, the temperature of the product mixture may be maintained below about 50° C., preferably 35° C.–45° C,. say 40° C. during the addition of the acid, which may be carried out over a period of about 15–45 minutes, say 30 minutes. Moderate agitation during the addition is beneficial.

Water is also preferably added in amount sufficient to facilitate separation of the trialkylphosphine salt from the product mixture. The amount of water added may typically be about 100–400, preferably 200–300, say 270 parts per mole of trialkylphosphine. An excessive amount of water may unnecessarily dilute the product and lower the volume efficiency. The water may be added prior to, after, or simultaneously with the acid. Preferably, the acid and water may be added simultaneously and preferably in the form of a solution of the acid in water. When the acid is hydrogen halide, solutions containing about 15%–45%, say 35–40% by weight acid may be employed. Commercially available concentrated hydrochloric acid may be highly preferred. When the acid is sulfuric acid, it may be added as a 5–30% by weight, and preferably 10–20%, say 15% by weight solution of sulfuric acid in water.

After the addition of the acid and water, the product mixture may be agitated for a short period, say 30 minutes, and the two phases which are formed may be allowed to separate. The magnesium halide-free product mixture aqueous phase, which contains the trialkylphosphine salt, is retained for recovery of product. The organic phase, containing inert hydrocarbon diluent and organic ether may preferably be distilled to recover the organic ether and inert hydrocarbon diluent.

The magnesium halide-free product mixture to which acid and water has been added may then be further treated to separate organic ether therefrom. Typically this may be accomplished by distilling, e.g., by azeotropically distilling, at atmospheric pressure to a head temperature of about 100° C. and maintaining this temperature for a short period, say 15 minutes. It may be desirable to add additional water at this point to facilitate handling. After separation of the organic ether, there may be conveniently recovered a magnesium halide-free and ether-free product mixture in an aqueous phase. Other equivalent means for separating the organic ether may be employed. For example, when the organic ether is highly insoluble in the aqueous phase, it may be separated physically.

In accordance with an alternative embodiment of this invention, the magnesium halide-free product mixture attained by the separation of magnesium halide from said product mixture may first be treated to separate organic ether therefrom. Typically this may be done by distilling or stripping, as hereinbefore set forth. After separation of the organic ether, there may be added to the ether-free product mixture water and a strong, inorganic, nonoxidizing acid, typically selected from the group consisting of hydrogen halide and sulfuric acid thereby forming an aqueous phase containing the trialkylphosphine salt of the acid employed.

The magnesium halide-free and ether-free product mixture may be cooled to a temperature below about 50° C., say 35–45° C. and base added thereto to form trialkylphosphine. The base may be a substance capable of reacting with the strong, inorganic, nonoxidizing acid to form a water-soluble salt thereof. Preferably, the base may be selected from the group consisting of ammonium hydroxide, alkali metal hydroxide, and alkaline earth metal hydroxide. Equivalent basic salts such as carbonates, bicarbonates, basic phosphates, etc. may also be employed. Ammonium compounds include substituted ammonium derivatives, e.g., alkylammonium compounds such as triethylammonium hydroxide, methylammonium hydroxide, etc. The ammonium hydroxides may be added to the aqueous solution as such or formed in situ by adding ammonia, triethylamine, methylamine, diethylamine, etc. The preferred base may be ammonium hydroxide which preferably may be added in the form of an aqueous solution.

Base may be added to the magnesium halide-free and ether-free aqueous solution of trialkylphosphine salt in amount sufficient to give a pH greater than 7, say 7–9. Typically, the base may be added in the amount of 1.0–1.3 equivalents, preferably 1.1–1.2 equivalents, say 1.1 equivalents per equivalent of strong, inorganic, nonoxidizing acid which has been added, and this amount may be sufficient to give the desired pH. It is preferred that the temperature be maintained below about 50° C., say 35–45° C. during the addition. The desired temperature may be maintained by adding the base slowly and providing external cooling if necessary. The resultant mixture may be agitated for a short period, say 30 minutes after the addition is complete.

Reaction of the base with the trialkylphosphine salt yields trialkylphosphine, which readily separates from the aqueous solution. Product trialkylphosphine may be recovered by simple physical separation. If desired, the product may be clarified by treating with activated carbon and filtering through diatomaceous earth.

The reactants and products of this process may react readily with oxygen. In order to avoid losses of materials and for safety, an inert atmosphere, e.g., nitrogen, is preferably maintained throughout the process.

Practice of the novel process of this invention permits attainment of unique advantages. The expensive and troublesome fractional distillation of product required by prior art processes is completely avoided. Loss of product by thermal decomposition is minimized and heat history is reduced. Product of exceptional purity, e.g., 98% purity, may be obtained without distillation. High yields, e.g., 80% of theory, are obtainable. The solvents employed, including organic ether and inert hydrocarbon diluent are retained in a form suitable for convenient recovery and 90% or higher recovery of solvents may typically be realized.

Practice of specific embodiments of this novel invention may be observed from the following illustrative examples.

EXAMPLE 1

A solution of 13.2 moles of n-butylmagnesium chloride in 4275 ml. (3800 gm.) of tetrahydrofuran was prepared by the reaction of magnesium chips with n-butyl chloride. This solution was cooled to 30° C., and 880 ml. (760 gm.) of xylene was added thereto. A solution of 548 g. (4 moles) of phosphorus trichloride in 350 ml. (300 g.) of xylene was added to the agitated Grignard reagent solution over a period of 3–4 hours, during which the pot temperature was maintained at 30–40° C. After the completion of the addition, the mixture was stirred for an additional 3–4 hours at 35–45° C.

1600 g. of cold water was then added slowly with agitation while maintaining the pot temperature below 40° C. After all of the water had been added, the magnesium chloride hexahydrate which formed was allowed to settle, and the upper organic phase was decanted off. An additional two liters of water was added to the magnesium halide hexahydrate residue, and a small additional quantity of organic phase was obtained and combined with the initial quantity.

The combined organic phases were stripped of organic ether by distilling to a vapor temperature of 50° C. at 55 mm. Hg. The residue was cooled to 30° C. and a mixture of 660 g. of concentrated hydrochloric acid (37%) and 660 g. of water was added while agitating and maintaining a pot temperature of about 40° C. When the addition was complete, agitation was continued for an additional 30 minutes, after which the mixture was allowed to separate. The lower, water-white, aqeous phase was separated from the organic phase.

To the separated aqueous phase there was added 465 ml. of ammonium hydroxide (29.4% $NH_3$), dropwise and with good agitation. A cooling bath was used to prevent the pot temperature from exceeding 40° C. Agitation was continued for 30 minutes, after which the mixture was allowed to separate. The product, tri-n-butylphosphine, was recovered as the top layer. A yield of 644 g. (79% of theory) of high purity tri-n-butylphosphine was obtained.

EXAMPLE 2

A solution of 10 moles of n-butylmagnesium chloride in 2510 g. of tetrahydrofuran was prepared by the reaction of magnesium chips with n-butyl chloride. This solution was cooled to 20° C. and 300 g. of xylene was added thereto. A blanket of nitrogen was maintained over the system. A solution of 395 g. (2.9 moles) of phosphorus trichloride in 445 g. of xylene was added to the cooled, agitated Grignard solution at a rate sufficient to maintain a temperature of about 35–40° C. At the end of the addition, the mixture was agitated at 35–40° C. for an additional 30 minutes.

The product mixture was added slowly to 2170 g. of water, under cooling, at a rate sufficient to maintain the reaction temperature below 45° C. The equipment was flushed with 300 g. of xylene. After the addition was completed, agitation was continued for 30 minutes and the phases were allowed to split. The aqueous phase, containing magnesium chloride hexahydrate, was separated from the organic, magnesium halide-free phase.

To the organic, magnesium halide-free phase there was added, with agitation and cooling, 347 g. of 36% (22° Bé.) hydrochloric acid at a rate such that the pot temperature did not exceed 40° C. Agitation was continued for 30 minutes, after which the phases were allowed to split, and the aqueous phase containing tri-n-butylphosphine hydrochloride was separated off.

The aqueous, magnesium halide-free phase was transferred to a distillation apparatus and an additional 400 g. of water was added thereto. Tetrahydrofuran and xylene were azeotroped off until the head temperature reached 102° C. and the pot temperature was 106–109° C. thereby removing substantially all of the ether from the product mixture.

The magnesium halide-free and ether-free product mixture was then cooled to 30–35° C. and 205 g. of aqueous ammonia (29% $NH_3$) was slowly added thereto at a rate sufficient to maintain a pot temperature below 40° C. When the addition was complete, the pH was adjusted to slightly greater than 7 with aqueous ammonia. The tri-n-butylphosphine separated from the aqueous phase and was recovered. The product was clarified with activated carbon. The product tri-n-butylphosphine was recovered in 79% yield and about 97% purity.

As may be seen from these illustrated examples, practice of this invention permits convenient preparation of exceptionally high purity trialkylphosphine in high yield without the necessity of undesirable fractional distillation.

Although this invention has been illustrated by reference to specific examples, numerous changes and modifications thereof which clearly fall within the scope of the invention will be apparent to those skilled in the art.

We claim:

1. The process for preparing trialkylphosphine which comprises (1) reacting a lower alkyl Grignard reagent with phosphorus trihalide in the presence of an organic ether thereby forming product mixture containing trialkylphosphine, organic ether, and magnesium halide; (2) adding to said product mixture water in amount at least sufficient to convert substantially all of said magnesium halide to magnesium halide hexahydrate; (3) decanting said magnesium halide hexahydrate from said product mixture thereby forming a magnesium halide-free product mixture; (4) adding to said magnesium halide-free product mixture, water and acid selected from the group consisting of hydrogen halide and sulfuric acid thereby forming an aqueous phase containing trialkylphosphine salt; (5) decanting organic ether from said magnesium halide-free product mixture thereby forming an ether-free product mixture; (6) adding base to said magnesium halide-free and ether-free product mixture in said aqueous phase thereby forming trialkylphosphine; and (7) recovering said trialkylphosphine.

2. The process claimed in claim 1 wherein said lower alkyl Grignard reagent is employed in the amount of 3–3.45 moles per mole of phosphorus trihalide.

3. The process claimed in claim 1 wherein said organic ether is employed in the amount of 2–10 moles per mole of Grignard reagent.

4. The process of claim 1 wherein said acid is hydrochloric acid.

5. The process claimed in claim 1 wherein said lower alkyl Grignard reagent is reacted with said phosphorus trihalide in the presence of an inert hydrocarbon diluent having a boiling point of 60–180° C., said inert hydrocarbon diluent being present in the amount of 100–400 parts by weight per 100 parts by weight of phosphorus trihalide.

6. The process claimed in claim 1 wherein said phosphorus trihalide is phosphorus trichloride.

7. The process for preparing trialkylphosphorus which comprises (1) reacting a lower alkyl Grignard reagent with phosphorus trihalide in the ratio of 3–3.45 moles of Grignard reagent per mole of phosphorus trihalide in the presence of an organic ether and an inert hydrocarbon diluent having a boiling point of 60–180° C., said hydrocarbon diluent being present in the amount of 100–400 parts by weight per 100 parts by weight of phosphorus trihalide thereby forming product mixture containing trialkylphosphine, organic ether, inert hydrocarbon diluent, and magnesium halide; (2) adding to said product mixture water in the amount of at least about 5 moles per mole of Grignard reagent and sufficient to convert substantially all of said magnesium halide to magnesium halide hexahydrate; (3) decanting said magnesium halide hexahydrate from said product mixture thereby forming a magnesium halide-free product mixture; (4) adding to said magnesium halide-free product mixture water and acid selected from the group consisting of hydrogen halide and sulfuric acid, said acid being added in the amount of 1–2 equivalents per mole of trialkylphosphine thereby forming an aqueous phase containing trialkylphosphine salt; (5) decanting organic ether from said magnesium halide-free product mixture thereby forming an ether-free product mixture; (6) adding base to said magnesium halide-free and ether-free product mixture in said aqueous phase thereby forming trialkylphosphine; and (7) recovering said trialkylphosphine.

8. The process of claim 7 wherein said acid is hydrochloric acid.

9. The process of claim 7 wherein said phosphorus trihalide is phosphorus trichloride.

10. The process of claim 9 wherein said lower alkyl Grignard reagent is butylmagnesium chloride and said trialkylphosphine is tributylphosphine.

References Cited

Houben-Weyl: Methoden der Organischen Chemie, 1963, pages 33 and 34.

TOBIAS E. LEVOW, *Primary Examiner.*

W. F. W. BELLAMY, *Assistant Examiner.*